US010605463B2

(12) United States Patent
Abdoo et al.

(10) Patent No.: US 10,605,463 B2
(45) Date of Patent: Mar. 31, 2020

(54) COOKING APPLIANCE WITH A USER INTERFACE

(71) Applicant: WHIRLPOOL CORPORATION, Benton Harbor, MI (US)

(72) Inventors: Joshua G. Abdoo, Stevensville, MI (US); Ariana M. Bruno, St. Joseph, MI (US); Matthew P. Ebrom, Holland, MI (US); Neomar Giacomini, St. Joseph, MI (US); Donald J. Gilmore, Berrien Springs, MI (US)

(73) Assignee: Whirlpool Corporation, Benton Harbor, MI (US)

(*) Notice: Subject to any disclaimer, the term of this patent is extended or adjusted under 35 U.S.C. 154(b) by 63 days.

(21) Appl. No.: 15/795,641

(22) Filed: Oct. 27, 2017

(65) Prior Publication Data
US 2019/0128531 A1 May 2, 2019

(51) Int. Cl.
F24C 7/08 (2006.01)
A23L 5/10 (2016.01)
A47J 27/00 (2006.01)
A47J 36/00 (2006.01)
F27D 21/00 (2006.01)
F27D 21/02 (2006.01)

(52) U.S. Cl.
CPC ............ F24C 7/086 (2013.01); A23L 5/15 (2016.08); A47J 27/002 (2013.01); A47J 36/00 (2013.01); F24C 7/085 (2013.01); F27D 21/0014 (2013.01); F27D 21/02 (2013.01); A23V 2002/00 (2013.01); F27D 2021/026 (2013.01)

(58) Field of Classification Search
CPC ...... F24C 7/086; F27D 21/02; F27D 21/0014; F27D 2012/026; A47J 36/00; A47J 27/002
USPC ........... 99/325; 219/392, 506, 681, 702, 712
See application file for complete search history.

(56) References Cited

U.S. PATENT DOCUMENTS

| 8,360,633 | B2 | 1/2013 | Luckhardt et al. |
| 9,538,880 | B2 | 1/2017 | Riefenstein |
| 9,557,064 | B2 | 1/2017 | Christiansen et al. |
| 2013/0092145 | A1* | 4/2013 | Murphy ................. F24C 7/085 126/21 R |
| 2016/0327279 | A1* | 11/2016 | Bhogal ............... H05B 1/0263 |
| 2017/0074522 | A1 | 3/2017 | Cheng |
| 2017/0115008 | A1 | 4/2017 | Erbe et al. |
| 2017/0208652 | A1 | 7/2017 | Luckhardt et al. |

FOREIGN PATENT DOCUMENTS

| DE | 102007048834 A1 | 4/2008 |
| EP | 2768363 B1 | 9/2017 |
| WO | 2009026895 A2 | 3/2009 |
| WO | 2016179424 A1 | 11/2016 |

OTHER PUBLICATIONS

European Search Report for Counterpart EP18189157.3, dated March 15, 2019.

* cited by examiner

Primary Examiner — Thien S Tran
(74) Attorney, Agent, or Firm — McGarry Bair PC

(57) ABSTRACT

A cooking appliance can include a cooking chamber and an imaging device for capturing an image of a food item inside the chamber. A computing device can be configured to compute a parameter for the food item based on the captured image which can be displayed on a user interface.

13 Claims, 4 Drawing Sheets

COOKING APPLIANCE WITH A USER INTERFACE

BACKGROUND

Household appliances typically comprise one or more components responsible for the electromechanical operations of the appliance. For example, an oven can include an appliance management component having a printed circuit board (PCB) with memory, as well as a user-interface component, such as a control panel or keypad, for a user to issue commands to the oven.

Food items can undergo changes in appearance during a cooking process, and it can be beneficial to track these changes or monitor a current state of a food item to prevent overcooking or overbaking.

SUMMARY

In one aspect, a cooking appliance includes a cooking chamber, an imaging device for capturing an image of a food item inside the cooking chamber, a computing device in communication with the imaging device and including a software module configured to receive the captured image from the imaging device and compute a real-time degree of browning, and a user interface configured to display a visual scale indicating the real-time degree of browning.

In another aspect, a method of cooking a food item in a cooking appliance having a cooking chamber and a display includes imaging a food item in the cooking chamber, determining a real-time degree of browning of the food item based on the imaging, and displaying on the display the real-time degree of browning on a visual scale.

DESCRIPTION OF EMBODIMENTS OF THE INVENTION

Aspects of the disclosure relate to a household appliance capable of cooking food items, wherein the appliance includes an imaging device for viewing the food items during cooking.

Figure 1:
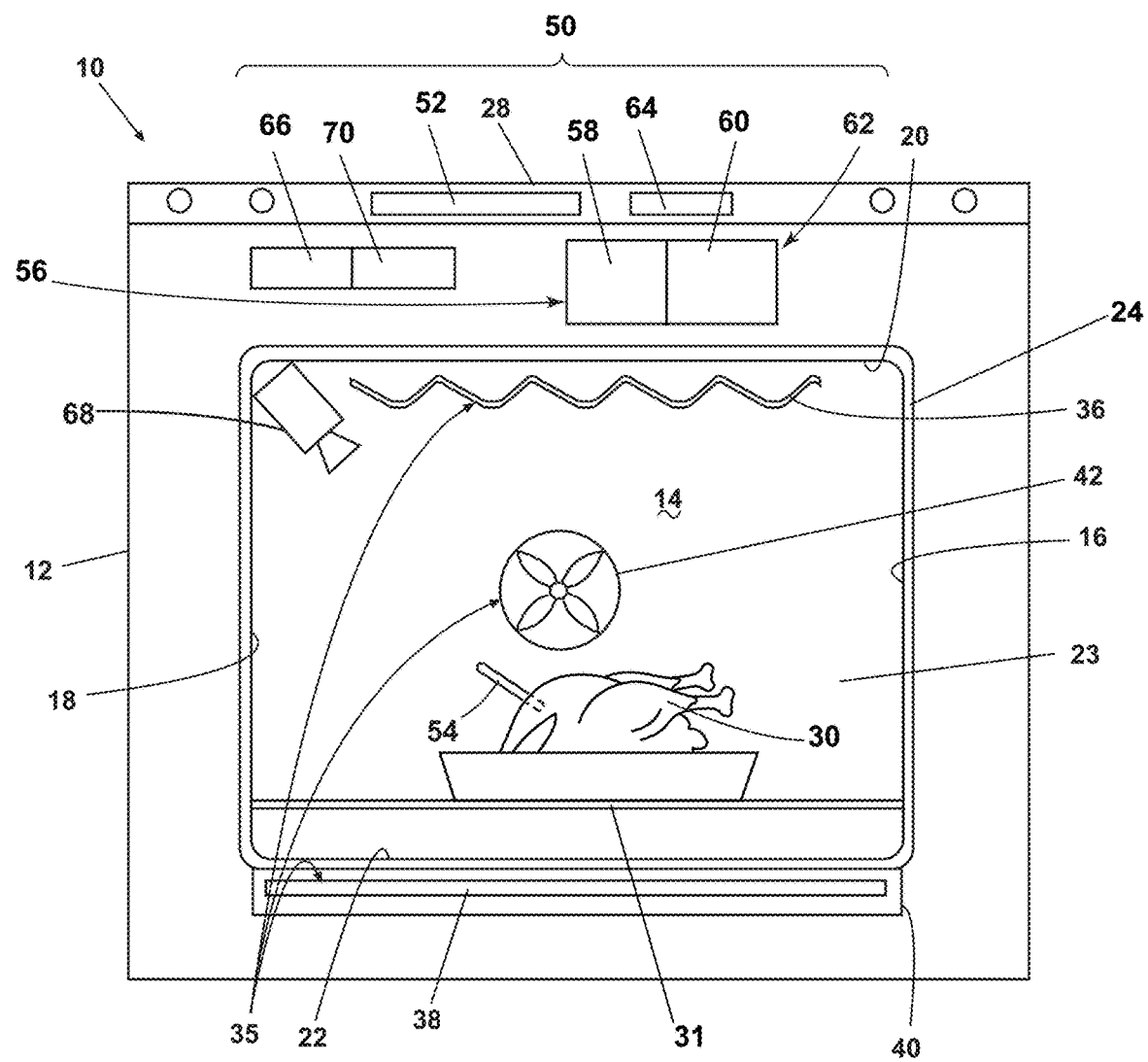
FIG. 1 is a schematic view of an exemplary household appliance including a user interface.

FIG. 1 illustrates an exemplary automatic household appliance in the form of an oven 10. It will be understood that while illustrated as an oven 10, the household appliance can include any home appliance used for cooking or preparing food, such as a toaster oven, cooktop, or microwave. The oven 10 can include a cabinet 12 with an open-faced cooking chamber 14 defined by a pair of spaced side walls 16, 18 joined by a top wall 20, a bottom wall 22, and a rear wall 23. A door 24 selectively closes the chamber 14. The door 24 in an open position can allow a user to access the chamber 14, while the door 24 in a closed position prevents access to the chamber 14 and seals the chamber 14 from the external environment. A food item 30 can be placed within the chamber 14 to be cooked by the oven 10.

The oven 10 can also include a heating system 35 having an upper heating element 36, commonly referred to as a broiler, and a lower heating element 38. The lower heating element 38 is illustrated in the example of FIG. 1 as being hidden or mounted beneath the cooking chamber bottom wall 22 in a heating element housing 40, where heat from the lower heating element 38 can conduct through the bottom wall 22 and into the chamber 14. Alternatively, the lower heating element 38 can be mounted inside the chamber 14, where heat can conduct or radiate inside the chamber 14. Further, the upper and lower heating elements 36, 38 can be mounted at the side walls 16, 18 of the chamber 14. The heating system 35 can further include a convection fan 42 that circulates air or steam within the chamber 14. The convection fan 42 can be any suitable fan and can be mounted in any suitable location of the chamber 14, such as in the rear wall 23.

An electronic system 50 capable of detecting, monitoring, or controlling various operation parameters can be included in the oven 10. The electronic system 50 can include a door position sensor 52 positioned within the cabinet 12 and capable of detecting whether the door 24 is in an open or closed state. In one example, the position sensor 52 can be a mechanically activated sensor that opens or closes an electrical circuit. Alternatively, the sensor 52 can be an infrared sensor, a sonic sensor, or any other suitable type of sensor for detecting the open and closed positions of the door 24. Furthermore, a temperature probe 54 can be included in the oven 10 and capable of detecting the ambient temperature within the chamber 14 or an internal temperature of the food item 30. The temperature probe 54 can output a signal indicating a sensed temperature via a wired or wireless connection as desired.

The electronic system 50 can also include a control panel 56 disposed on the oven cabinet 12 and having a user interface 58 and display 60 for inputting desired parameters such as temperature or cooking time. The user interface 58 is illustrated herein as being integrated with the display 60 in the form of a touch-screen display 62 on the oven cabinet 12. It is also contemplated that the user interface 58 can include manually-operated components such as buttons or dials, and a separate display 60 can also be disposed on the cabinet 12. Furthermore, in an example where the display 60 includes a touch-screen display, the user interface 58 can include a combination of touch-screen components integrated with the display 60 as well as manually-operated components separate from the display 60.

A controller 64 can also be included in the electronic system 50, located in the cabinet 12 and configured to communicate with the control panel 56. The controller 64 can include any suitable controller for the oven environment, and it is contemplated that the user interface 58 can be utilized to select an oven cooking program which the controller 64 is capable of implementing. Additionally, the oven 10 can include an appliance communication module 66 capable of providing for data communication with a server or a mobile device (not shown), using wired or wireless connections where appropriate.

The oven electronic system 50 can further include a camera 68, illustrated as being disposed within the chamber 14. The camera 68 can be positioned anywhere within or adjacent to the chamber 14, including within or outside the door 24, and is capable of imaging the food item 30, either by capturing static images or video. Furthermore, a computing device 70 can be configured to receive image or video data from the camera 68 and perform computations or comparison operations as desired. While the computing device 70 is illustrated herein as being included in the oven 10, it is also contemplated that the computing device 70 can be located in a remote device such as a mobile phone or tablet or in a cloud-based server, where the remote device or server can be in data communication with the oven 10.

Figure 2:
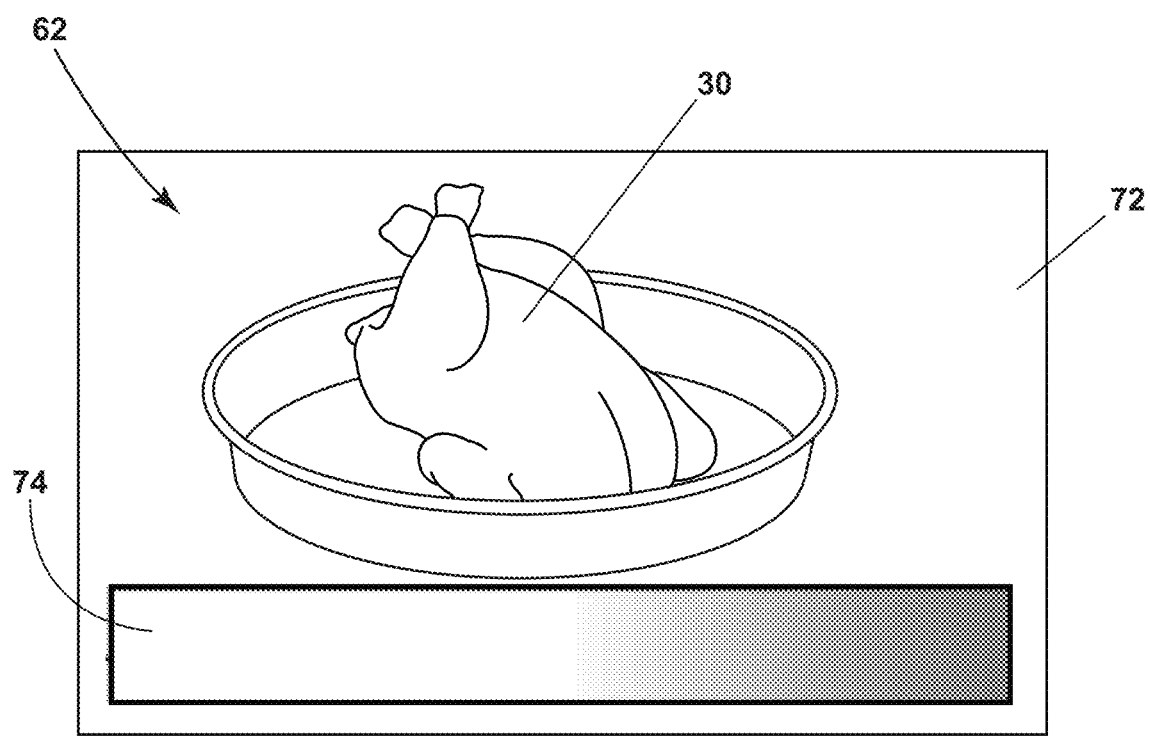
FIG. 2 illustrates a display of the appliance of FIG. 1 including a visual scale.

Turning to FIG. 2, a schematic view of the touch-screen display 62 is shown, which incorporates the user interface 58 and display 60 as described above. After placing the food item 30 in the cooking chamber 14 (FIG. 1), the display 62 can show a real-time image 72 of the food item 30 as captured by the camera 68.

A visual scale 74 can be generated on the touch-screen display 62, illustrated herein as a gradient-shaded scale where the left side indicates no browning of the food item 30, and the right side indicates a substantial degree of browning of the food item 30. It will be understood that the gradient-shaded visual scale in the example of FIG. 2 can be calibrated in a number of ways. In one example, the right-hand side can be calibrated to indicate the food item 30 is totally burned, blackened, or charred; in another example, the right-hand side of the visual scale 74 can indicate the greatest desirable degree of browning for the food item 30 before burning occurs. It is also contemplated that the visual scale can include numeric indicators, a series of pictorial symbols such as check marks, or a series of text captions such as "No browning," "Lightly browned" or "Very dark brown" in non-limiting examples.

As used herein, "browning" or "degree of browning" will be used to refer to finishing, texture, or doneness of food items. "Browning" can include a variety of food item qualities including, in non-limiting examples:
  a color of a food item such as "lightly browned" or "very dark brown"
  cheese being melted, bubbly, or browned around the edges
  food item textures such as dry, juicy, stringy, soft, firm, chalky, or tender
  bread crusts being soft or crisp
  breads proofing, rising, or becoming crusty
  meats being cooked to doneness levels such as "rare," "medium", or "falling off the bone"
  vegetables becoming tender, limp, or crisped
  butters or oils becoming melted or softened
  eggs being cooked to finishing levels such as "over easy" or "hard boiled"

It will be understood that other food item finishing, texture, or doneness qualities not listed are also contemplated by use of the "browning" descriptor. Furthermore, it can be appreciated that the visual scale 74 can be calibrated to indicate qualities including "No melting," "Substantial melting," "No rising, "Moderately risen dough," and the like, in non-limiting examples.

Figure 3:
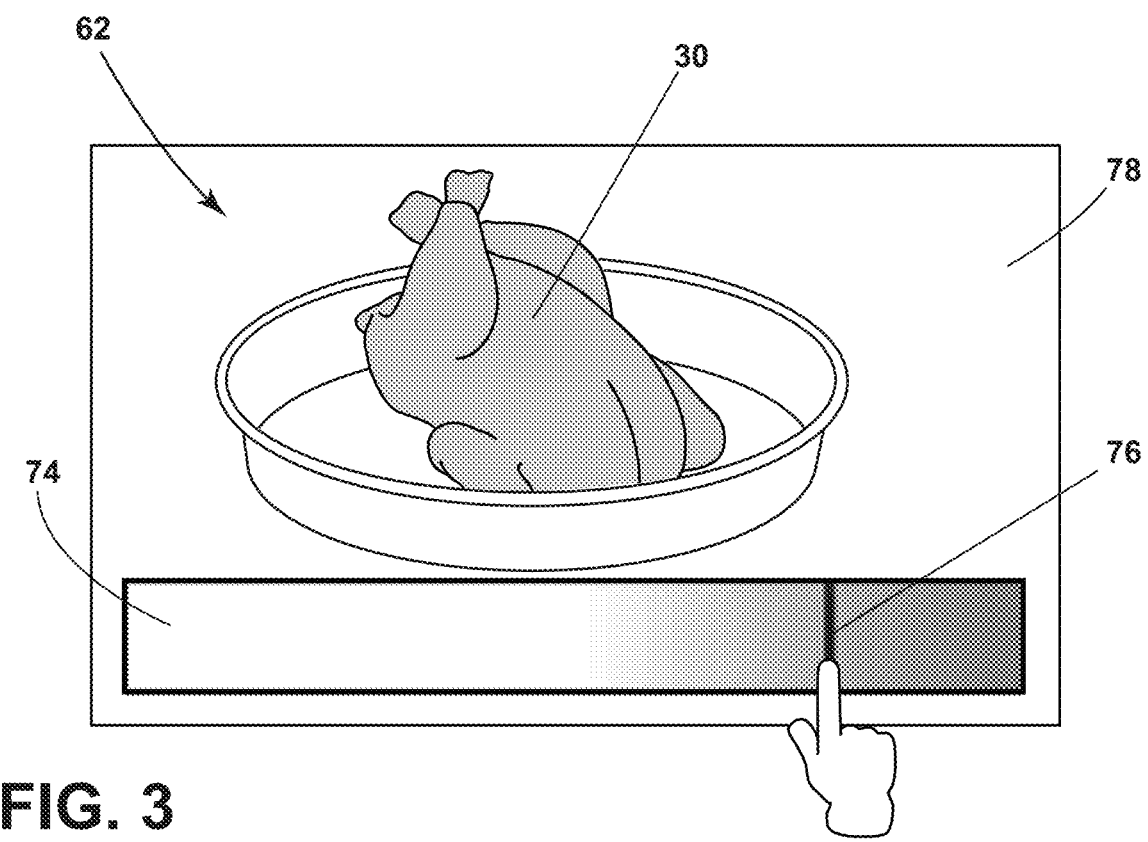
FIG. 3 illustrates an aspect of the visual scale of FIG. 2.

FIG. 3 illustrates that the touch-screen display 60 can be utilized to select a target degree of browning 76, such as by a user tapping or sliding a finger along the visual scale 74. Furthermore, the display 62 can be configured to modify the real-time image 72 (FIG. 2) of the food item 30 and to generate a target image 78 indicating how the food item 30 may appear with the selected target degree of browning 76. In one example, sliding a finger toward the right along the visual scale 74 can make the food item appear on the display 62 with progressively greater degrees of browning; lifting one's finger from the visual scale 74 can set the target degree of browning 76 and associated target image 78 of the food item 30. In this manner, the touch-screen display 62 can act as a selector to set the target degree of browning 76, which can be utilized by the oven 10 to prepare the food item 30.

Figure 4:
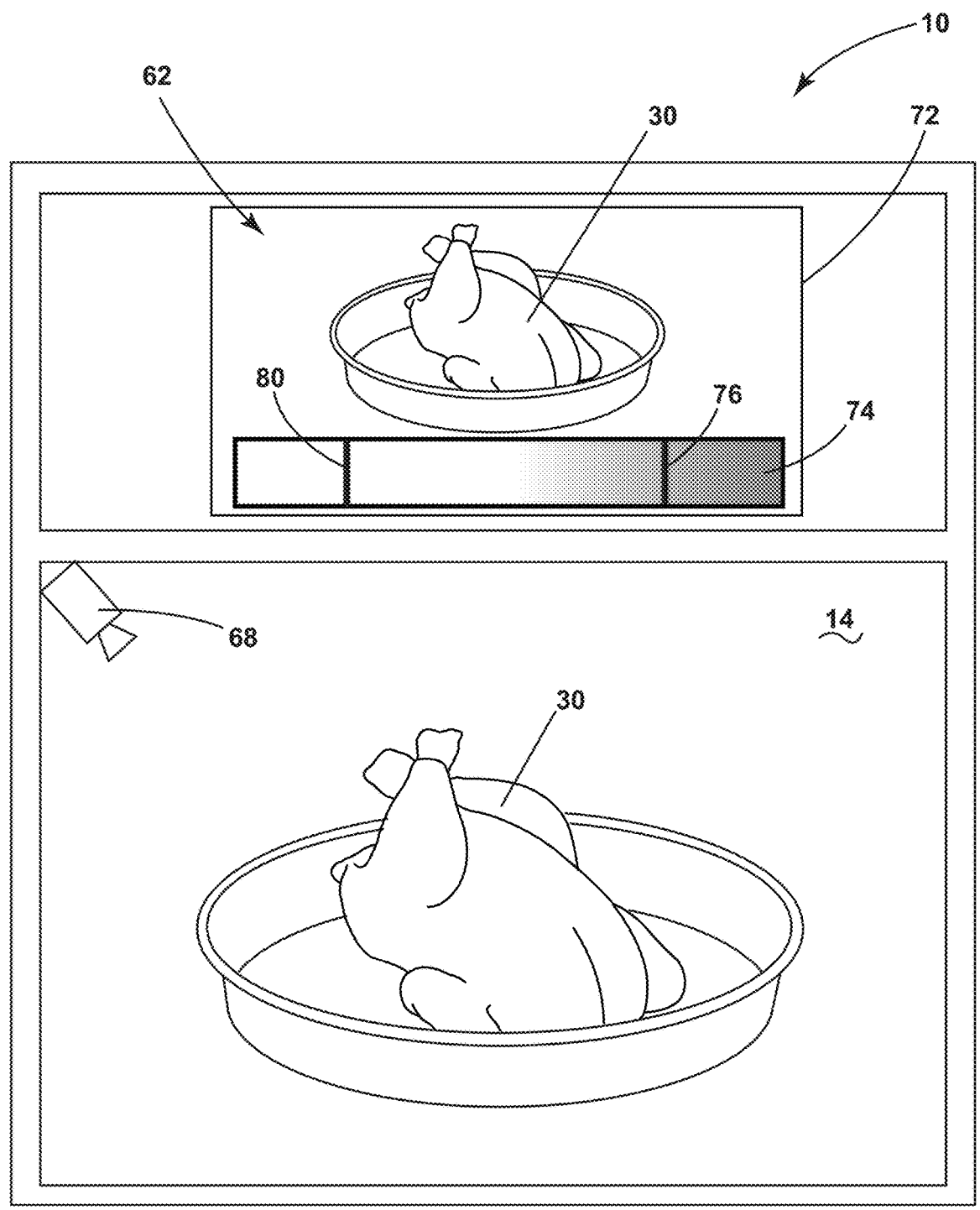
FIG. 4 illustrates a cooking chamber in the household appliance of FIG. 1.

Turning to FIG. 4, a schematic view of the oven 10 illustrates in one example that the camera 68 can capture the real-time image 72 or video of the food item 30 to be displayed on the touch-screen display 62 during the cooking or baking process. The visual scale 74 can indicate a real-time degree of browning 80 of the food item 30, which can be updated on the scale 74 in real time. It can be appreciated that as the cooking or baking process continues, the real-time degree of browning 80 can progress toward the right of the visual scale 74 on the display 62. The target degree of browning 76 can also be displayed on the visual scale 74; in the example of FIG. 4, the real-time 80 and target 76 degrees of browning are both displayed on the same visual scale 74. In another example, the display 62 can generate a real-time visual scale for the real-time degree of browning 80, and a separate target visual scale for the target degree of browning 76. In yet another example, the visual scale 74 can solely indicate the real-time degree of browning 80 unless a user selects an option to show or hide the target degree of browning 76. Other examples in the spirit of the present disclosure are contemplated for use in the oven 10.

Figure 5:
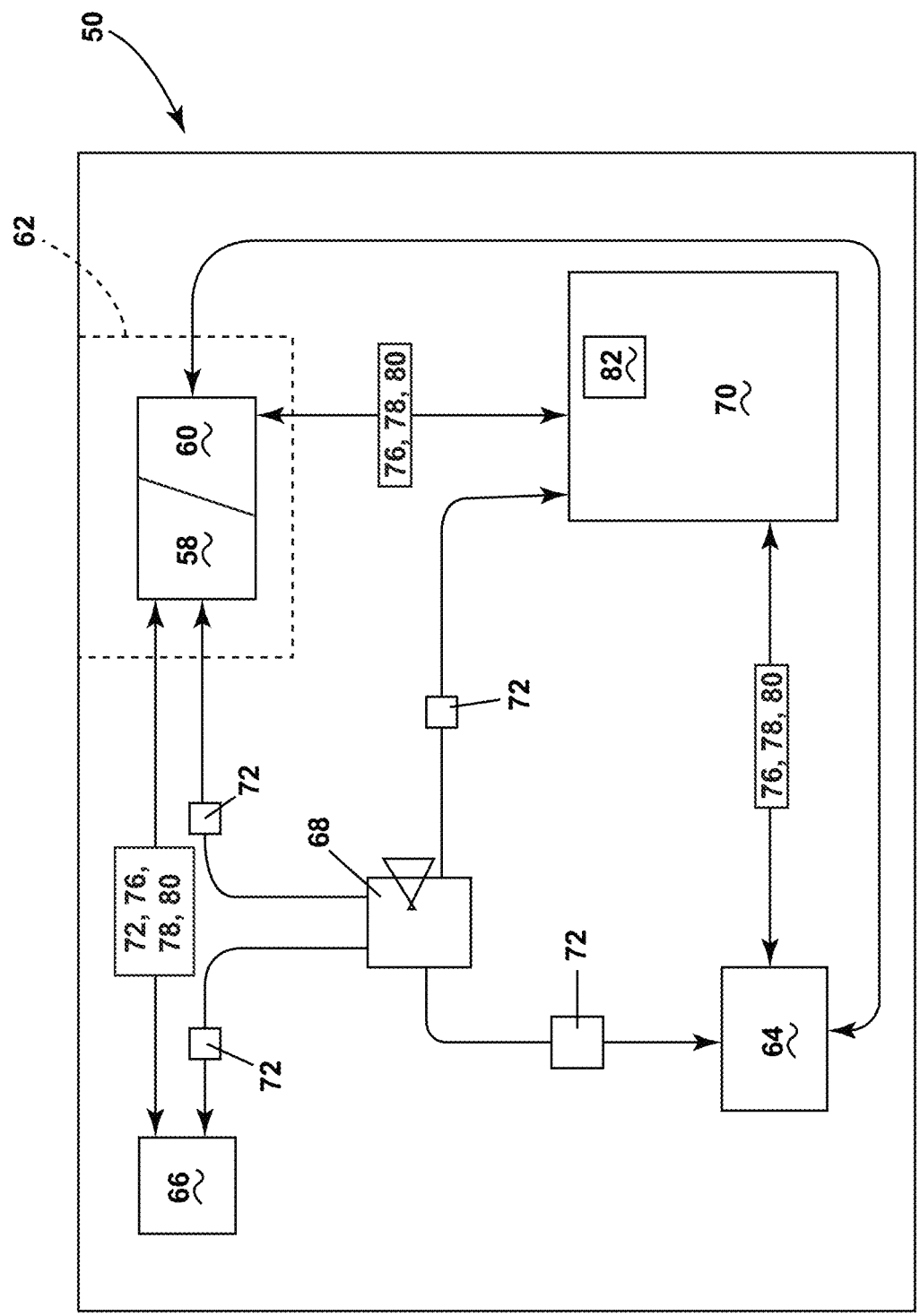
FIG. 5 is a schematic view of an electronic system utilized in the household appliance of FIG. 1.

Referring now to FIG. 5, the electronic system 50 is shown in further detail where arrows illustrate exemplary data communication between illustrated components. It will be understood that other data or signal communications not illustrated may exist between components, and that other components may also be included in the electronic system 50.

It can be appreciated that the camera 68 can capture the real-time image 72 and output this image 72 to the display 62, computing device 70, controller 64, or communication module 66. As in the example of FIG. 4 the touch-screen display 62 includes the display 60 and user interface 58; it is also contemplated that the display 62 and user interface 58 can be distinct components in data communication with one another. The user interface 58 can be utilized to generate the target image 78 and output this image 78 to the computing device 70. Additionally, the user interface 58 can also output or receive signals or commands directly to/from the controller 64.

The computing device 70 can include a software module 82 configured to compute the real-time degree of browning 80 based on the real-time image 72. The target degree of browning 76 can be selected by the user in the example of FIG. 3; in another non-limiting example, the software module 82 can compute the target degree of browning 76 based on an automatic cooking program. Once determined, the computing device 70 can output the real-time degree of browning 80, the target degree of browning 76, or the target image 78 to the display 62, user interface 58, or controller 64.

The software module 82 can include any suitable algorithm to compute the real-time degree of browning 80. In an example where the real-time degree of browning 80 refers to a color of the food item 30, one exemplary algorithm can include the following:
  receiving the real-time image 72
  analyzing the red-green-blue (RGB) color value of each pixel in the image 72 associated with the food item 30
  averaging all RGB color values of all food-item pixels in the image 72 to compute a single RGB color value representative of the food item 30
  converting the single RBG color value to a real-time degree of browning 80 on the visual scale 74
  outputting the real-time degree of browning 80

It will be understood that other processes or algorithms can be utilized to compute the real-time degree of browning 80, including in examples where "degree of browning" refers to food item textures as described above, such as a state of melting cheese. In addition, while illustrated within the oven electronic system 50, it is also contemplated that the software module 82 can be located in a remote device such as a mobile phone or tablet (not shown), or in a cloud-based server (not shown), in non-limiting examples.

Upon receipt of either or both images 72, 78, or either or both degrees of browning 76, 80, the controller 64 can issue commands to the oven 10. In one example, the computing device 70 can determine that the real-time degree of browning 80 is within a given range of the target degree of browning 76, such as within 10% on a numeric scale, or within two shade ranges on the visual scale 74 in non-limiting examples. This determination can be output to the controller 64, which can reduce an operating temperature of the oven 10 as a result.

The communication module 66 can also communicate with a remote device such as a mobile device with a display (not shown). It is contemplated that the real-time image 72, target image 78, real-time degree of browning 80, or target degree of browning 76 can be displayed on a mobile device, where a user can update the target degree of browning or monitor the real-time degree of browning via the mobile device while away from the oven 10.

In one example, a message can be output to the display 62 or a remote device (not shown) indicating that the real-time degree of browning is within a given range (such as two shade ranges on the visual scale 74) of the target degree of browning 76.

In another example, upon determination that the real-time and target degrees of browning 80, 76 are equal, the controller 64 can turn off the heating elements 36, 38 (FIG. 1) and notify a user on the display 62 or on a remote device (not shown) that the baking process is complete.

In an example where the baking process is not automatically terminated, the controller 64 can output a message on the display 62 or a remote device, including on the visual scale 74, when the real-time degree of browning 80 reaches or exceeds the target degree of browning 76. Other examples in the spirit of the present disclosure are contemplated for use in the oven 10.

In still another example, the temperature probe 54 of FIG. 2 can output a current temperature of the food item 30 to the computing device 70 of FIG. 5. The computing device can determine whether operation of the heating system 35 (FIG. 1) should be continued, terminated, or a user can be prompted for further instruction based on the food item temperature in combination with the real-time degree of browning 80 and target degree of browning 76. For example, it may be possible that the food item temperature is below a safe level for consumption while the real-time degree of browning 80 is approaching the target degree of browning 76; in such a case, the controller 64 can reduce the operating temperature of the oven 10 to increase the food item temperature while limiting the increase of the real-time degree of browning 80. It is also contemplated that a message can be output to the display 62 or to a remote device (not shown) prompting a user to select from a list of options including, but not limited to, "reduce temperature," "accept current degree of browning," or "modify target degree of browning."

A method of cooking the food item 30 in the oven 10 can include imaging the food item 30 in the cooking chamber 14, determining the real-time degree of browning 80 based on the real-time image 72, and displaying on the touch-screen display 62 (or an independent display 60) the real-time degree of browning 80 on the visual scale 74 as described above. It can be appreciated that the food item 30 can be imaged multiple times or repeatedly during the cooking process, and the visual scale 74 can be continually updated to show the real-time degree of browning 80. The target degree of browning 76 can be user-defined, such as by use of the touch-screen display 62 or an independent user interface 58, and the target degree of browning 76 can be displayed on the touch-screen display 62 or on a remote device as described above.

It can be appreciated that aspects of the present disclosure provide for the ability to monitor the visual appearance of a food item during a cooking process, as well as providing a visual scale to quickly assess the completeness of a cooking process by way of assessing the degree of browning. A user may be more familiar with assessing "doneness" of a food item (where "doneness" can be assessed by a degree of browning, crispiness, or other changes in color or texture) by way of visual inspection as compared with a traditional temperature measurement, which may rely on reference values depending on the food item being cooked in the appliance.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cooking appliance comprising:
    a cooking chamber;
    a user interface comprising a selector configured to allow a user to set a target degree of browning;
    an imaging device for capturing an image of a food item inside the cooking chamber;
    a computing device in communication with the imaging device and comprising a software module configured to receive the captured image from the imaging device and compute a real-time degree of browning; and
    the user interface configured to display a visual scale indicating the real-time degree of browning based on the computed degree of browning and the target degree of browning and where the user interface also displays a real time image of the food item.

2. The cooking appliance of claim 1 wherein the user interface further displays a target image of the food item based on the target degree of browning.

3. The cooking appliance of claim 1 wherein the computing device is in data communication with the selector.

4. The cooking appliance of claim 3 wherein the computing device compares the real-time degree of browning to the target degree of browning.

5. The cooking appliance of claim 4 further comprising a controller configured to modify operation of the appliance when the comparison indicates that the target degree of browning at least equals the real-time degree of browning.

6. The cooking appliance of claim 5 further comprising a temperature probe in communication with the computing device and outputting a temperature reading.

7. The cooking appliance of claim 6 wherein the controller is further configured to modify operation of the appliance based on the temperature reading.

8. The cooking appliance of claim 7 wherein the computing device adjusts a cooking time or temperature based on the temperature reading and target degree of browning.

9. The cooking appliance of claim 1 wherein the user interface comprises a touch screen.

10. The cooking appliance of claim 1 wherein the captured image comprises pixels.

11. The cooking appliance of claim 10 wherein each pixel is correlated to a red-green-blue color value.

12. The cooking appliance of claim 11 wherein a single red-green-blue color value is computed based on an average of all red-green-blue pixel values.

13. The cooking appliance of claim 12 wherein the real-time degree of browning is converted from the single red-green-blue color value.

* * * * *